March 8, 1966 J. GROSS 3,239,404
DOUBLE V RAM GUIDE FOR HIGH FREQUENCY HEAT SEALING MACHINE
Filed Jan. 26, 1962
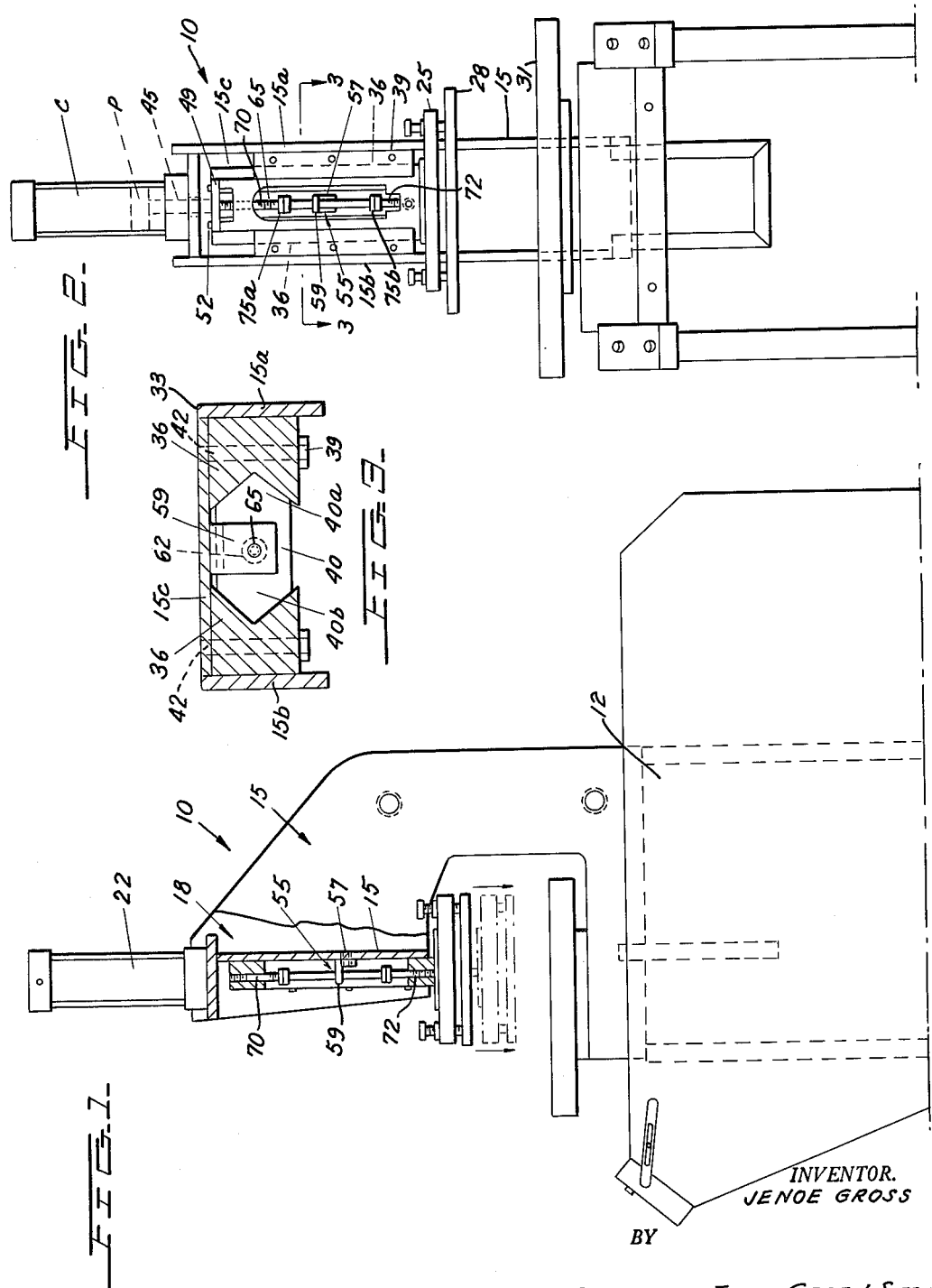
INVENTOR.
JENOE GROSS
BY
OSTROLENK, FABER, GERB & SOFFEN
ATTORNEYS United States Patent Office 3,239,404
Patented Mar. 8, 1966

3,239,404
DOUBLE V RAM GUIDE FOR HIGH FREQUENCY
HEAT SEALING MACHINE
Jenoe Gross, 655 Montgomery St., Brooklyn, N.Y.
Filed Jan. 26, 1962, Ser. No. 173,854
1 Claim. (Cl. 156—380)

This invention relates to high frequency heat sealing machines and more particularly to a mechanism for accurate operation of the ram thereof, together with means for effecting stops or motion limits of the ram at desired upper and lower points in the traverse.

It is an object of the invention to provide a simple, rugged and effective ram guiding device for dielectric heat sealing machines.

It is another object of the invention to provide means for accurate setting of stops whereby the motion of the ram may be limited in either direction.

Other objects and features of the invention will be apparent from the description to follow:

Briefly, my invention contemplates the provision, in connection with an air-operated ram of a heat-sealing machine, of a pair of laterally spaced guides having inwardly facing V-shaped grooves. The ram is disposed intermediate the grooves and is correspondingly shaped to slide within the grooves. Thus, the ram is precisely retained in its reciprocal path by virtue of the V-shaped grooves serving as guides for both sides of the ram. Further, the ram is provided with adjustable stop means coacting with a fixed abutment carried by the ram housing for limiting the motion of the ram in either upward or downward direction. Thus, the ram carries a threaded rod on which are two pairs of nuts, the pairs being spaced from each other and on opposite sides of a fixed abutment. By varying the position of either pair of nuts, one nut in each pair being a jamb nut, abutment thereof with the fixed element serves to stop the movement of the ram. Inasmuch as an air cylinder or non-positive drive for the ram is utilized, such stopping of the ram does not effect any damage as would be the case of a positively driven ram.

A detailed description of the invention now follows in which:

FIGURE 1 is a side view of a heat sealing dielectric type of a machine showing certain components of the invention in cross-section;

FIGURE 2 is a front view of the machine in elevation; and

FIGURE 3 is a section through 3—3 of FIGURE 2.

Referring now to the drawing, a machine generally designated as 10 is disclosed having a base 12 supporting a frame 15, having a ram mechanism generally designated as 18 reciprocally carried by the frame, and an air cylinder 22 for actuating the ram plunger 40. Secured at the lower end of the ram is an electrode carrier 25 to which may be secured an electrode plate 28 which coacts with a lower electrode plate 31 in a manner well understood.

The ram mechanism comprises a housing which may be the sides 15a and 15b of the frame 15 together with an integral backing plate 15c as shown in FIGURES 2 and 3. Thus, as shown in FIGURE 3, the frame may be made of individual pieces of steel plate welded together, to effect the sides 15a and 15b and the back plate 15c. To the plate 15c are secured a pair of spaced, solid and fairly massive guides 36 which may be rigidly fastened as by bolts 39 provided in plurality and passing through the respective apertures 42 of the support plate 15c. It will be noted that the guides have oppositely facing V-shaped grooves of substantially 90° angularity, which grooves receive for smooth sliding with precision accuracy the plunger 40 having correspondingly V-shaped edges engaging the surfaces of respective grooves. The plunger has longitudinal openings front and rear as shown. Reference is made to FIGURES 2 and 3 which show the plunger construction. Thus, the lateral V-shaped contours 40a and 40b are clearly disclosed. The plunger may be connected in any suitable manner as by a post 45 to the piston P within the air cylinder C. Accordingly, it will be appreciated that reciprocal motion of the piston will carry the plunger with it, the post 45 being threaded to a plate 49 which will be understood to be securely bolted to the top of the plunger, by the bolts 52 provided in any suitable plurality.

The back plate 15c carries a motion limiting fixed abutment 55 which is angular in shape having a downwardly extending leg 57 secured to the back plate as by melding or bolting or in any suitable manner. The horizontally extending leg 59 of abutment 55 extends through the open rear of the plunger and is provided with an aperture 62 through which passes a threaded rod 65. The upper and lower ends of the rod are secured in the respective upper and lower ends of the plunger as by threaded sections 70 and 72 respectively. Rod 65 must be retained against rotating and to this end it may be jambed against threaded post 45 or a separate jamb nut at the extreme upper or lower end acting against the plunger may be used. Rod 65 carries a pair of nuts 75a above the abutment leg 59 and another pair of nuts 75b below the abutment leg 59. It will thus be appreciated that either pair of nuts may be manually adjusted through the open front of the plunger with respect to leg 59 and tightened against each other so that as the plunger moves up and down its motion in either direction will be instantly and positively arrested by engagement of either pair of the nuts with the abutment leg 59.

From the above description, it will be apparent that the construction provides a very rugged arrangement for accurate guidance of the plunger which in coaction with the positive limiting effect of the adjustable pairs of nuts achieves a plunger guiding device of considerable precision and reliability, to the end that very precise control of the plunger for achieving highly accurate heating plate motion control can be realized.

Having thus described my invention, I am aware that various changes may be made without departing from the spirit thereof and, therefore, do not seek to be limited to the precise illustration herein given, except as set forth in the appended claim.

I claim:

In a high frequency heat sealing machine, a plunger, a pair of laterally spaced fixed guides for said plunger, said guides being provided with V-shaped grooves in opposed relation, said plunger being disposed between said guides and having V-shaped edges slidably disposed in respective grooves, said plunger having a longitudinal through opening, means carried within said plunger and movable therewith and being longitudinally adjustable to a predetermined position, a fixed abutment extending into said opening and disposed in the path of motion of said means for engagement thereby to limit the motion of said plunger, said machine having a frame portion comprising a plate, said guides and said abutment being secured to said plate.

References Cited by the Examiner

UNITED STATES PATENTS

| | | | |
|---|---|---|---|
| 348,568 | 9/1886 | McGowan. | |
| 2,495,084 | 1/1950 | Wells | 100—257 |
| 2,546,100 | 3/1951 | Johansen et al. | 156—380 |
| 2,980,013 | 4/1961 | Swick et al. | 100—257 |
| 3,040,153 | 6/1962 | Seney | 156—380 |
| 3,133,494 | 5/1964 | Hecht | 83—527 X |
| 3,172,798 | 3/1965 | Rosenbaum | 156—380 |
| 3,178,983 | 4/1965 | Brunson | 100—257 X |

JACOB H. STEINBERG, *Primary Examiner.*

HAROLD ANSHER, ALEXANDER WYMAN,
*Examiners.*